(12) United States Patent
Trovi

(10) Patent No.: US 11,344,908 B2
(45) Date of Patent: May 31, 2022

(54) ADHESIVE APPLICATOR ROLLER AND MACHINE COMPRISING THE ROLLER

(71) Applicant: QUARRATA FORNITURE S.r.l., Quarrata (IT)

(72) Inventor: Roberto Trovi, Quarrata (IT)

(73) Assignee: QUARRATA FORNITURE S.r.l., Quarrata (IT)

( * ) Notice: Subject to any disclaimer, the term of this patent is extended or adjusted under 35 U.S.C. 154(b) by 1020 days.

(21) Appl. No.: 15/779,564

(22) PCT Filed: Nov. 25, 2016

(86) PCT No.: PCT/IB2016/057135
§ 371 (c)(1),
(2) Date: May 29, 2018

(87) PCT Pub. No.: WO2017/093870
PCT Pub. Date: Jun. 8, 2017

(65) Prior Publication Data
US 2020/0298267 A1  Sep. 24, 2020

(30) Foreign Application Priority Data

Nov. 30, 2015 (IT) ..................... 102015000078439

(51) Int. Cl.
| | |
|---|---|
| *B05C 1/08* | (2006.01) |
| *B05C 1/16* | (2006.01) |
| *B29C 65/52* | (2006.01) |
| *B68G 7/12* | (2006.01) |

(52) U.S. Cl.
CPC .......... *B05C 1/0813* (2013.01); *B05C 1/0808* (2013.01); *B05C 1/16* (2013.01); *B29C 65/524* (2013.01); *B68G 7/12* (2013.01)

(58) Field of Classification Search
None
See application file for complete search history.

(56) References Cited

U.S. PATENT DOCUMENTS

| | | | |
|---|---|---|---|
| 3,524,781 A | 8/1970 | Winterroth et al. | |
| 4,879,967 A * | 11/1989 | Sengoku | B29C 33/58 118/259 |
| 4,957,423 A * | 9/1990 | Yokoya | B29C 31/06 425/115 |
| 2009/0155463 A1 | 6/2009 | Whitehurst | |

FOREIGN PATENT DOCUMENTS

| | | |
|---|---|---|
| AT | 378133 B | 6/1985 |
| DE | 3540233 A1 | 5/1987 |
| EP | 1070548 A2 | 1/2011 |

OTHER PUBLICATIONS

International Search Report and Written Opinion of the International Searching Authority for PCT/IB2016/057135, dated Mar. 30, 2017.

* cited by examiner

*Primary Examiner* — Jethro M. Pence
(74) *Attorney, Agent, or Firm* — Shuttleworth & Ingersoll, PLC; Timothy Klima

(57) ABSTRACT

Described is a roller for the automatic application of at least one adhesive on a sheet for mattresses, which makes it possible to optimise the time needed for processing and the precision of the distribution of adhesive on the sheet in relation to the desired pattern, eliminating the waste of adhesive.

12 Claims, 3 Drawing Sheets

ADHESIVE APPLICATOR ROLLER AND MACHINE COMPRISING THE ROLLER

CROSS REFERENCE TO RELATED APPLICATIONS

This application is a national stage filing under section 371 of International Application No. PCT/IB2016/057135, filed on Nov. 25, 2016, published in English on Jun. 8, 2017 as WO 2017/093870 A1 which claims priority to Italian Patent Application No. 102015000078439, filed on Nov. 30, 2015, the entire disclosure of these applications being hereby incorporated herein by reference.

TECHNICAL FIELD

This invention relates to a roller for the automatic application of at least one adhesive on a sheet for mattresses, which makes it possible to optimise the time needed for processing and the precision of the distribution of adhesive on the sheet in relation to the desired pattern, eliminating the waste of adhesive.

BACKGROUND ART

Mattresses without springs are currently produced by gluing on top of each other several sheets made of suitable material, for example expanded polyurethane, and each having the shape in plan of the mattress. Spring mattresses, on the other hand, comprise a container made from several sheets designed to make the respective walls of the container, and designed to house the springs of the mattress. The container, before being closed by gluing the sheet forming the upper base surface on the sheets which form the side walls, is designed to receive the system of springs of the mattress.

The adhesive may be the solvent, water-based or hot-melt type. Solvent adhesives are no longer greatly used due to problems linked to the residual odour, their flammability and their toxicity.

The hot-melt adhesives require very expensive apparatuses from the point of view of management and maintenance.

The water-based adhesives are currently a good compromise.

Usually, without considering the application by brush, solvent adhesives can be applied by spraying and water-based adhesives can be applied both by spraying and spreading with rollers.

By means of the spraying, which can be either manual or automatic, the level of precision in depositing the adhesive is very limited, in particular near the edges, and in general relative to the pattern or design which the adhesive should ideally define.

Spreading by brush requires a very long time.

Spreading by rollers, which can be either manual or automatic, is performed by two counter-rotating cylindrical rollers which are translated on the application surface of the sheet, thereby rolling on that surface.

The pair of rollers is completed by panels, which are located on opposite sides of the pair of rollers. These panels face the base surfaces of the rollers on one side and on the other side both the side surfaces of the rollers, and are positioned transversally to the respective axes of rotation, in such a way as to close laterally the space interposed between the two rollers. The adhesive is supplied inside the "tank" which forms centrally between the respective side surfaces of the rollers, which are coaxial to the two axes of rotation, and the side panels.

The distance, which can usually be adjusted, between the two side-by-side surfaces of the rollers determines the dosage of the adhesive during the application step; a larger space allows a greater passage of adhesive, whilst a smaller distance, on the other hand, limits the quantity applied.

By recirculating between the moving rollers, the material which makes the adhesive tends however to become pasty, and in particular, as a result of the mechanical force to which it is subjected when it passes between the two rollers close to each other, it tends to coagulate which causes a waste in adhesive and adversely affects the precision in the application of the adhesive.

The need to rotate the rollers means that the side containment panels must be spaced from the base surfaces of the rollers with a certain tolerance, leaving a gap between each panel and the rollers, which can contain unwanted further coagulation of the adhesive.

DISCLOSURE OF THE INVENTION

The aim of this invention is to provide a device for applying adhesive preferably water-based and on sheets for mattresses, which allows to the waste of adhesive to be significantly reduced.

Another aim of this invention is to provide a device for applying adhesive preferably water-based and on sheets for mattresses, which allows the precision in depositing adhesive to be increased also in relation to the pattern to be obtained on the sheet.

A further aim of this invention is to provide a device for applying adhesive, preferably water-based, on sheets for mattresses, which allows the time for dispensing the adhesive to be planned and programmed with precision, in such a way as to make exactly the desired geometrical pattern according to which the adhesive is spread on the sheet.

These aims are obtained by a device for applying adhesive on a sheet for mattresses, comprising an element rotating around at least one axis of rotation. The element has at least one outer side surface, which is preferably at least partly coaxial with the axis of rotation. The rotary element being designed, by rolling the element on the sheet, to cause the application of the adhesive on the sheet due to at least the rotation of the rotary element.

The device is characterised in that it comprises at least one channel and at least one nozzle associated with the channel. The nozzle is designed to dispense the adhesive towards the channel.

The channel is designed to receive the adhesive and transport the adhesive towards the sheet during the rotation, in such a way as to cause the subsequent application of the adhesive on the sheet. The channel is positioned on the side surface.

Preferably the application of the adhesive occurs by spreading with the rotary element.

The rolling is a movement which comprises a translation of the element on the sheet and its simultaneous rotation about the axis of rotation.

The channel allows the adhesive to be guided or conveyed in a precise manner along the side surface of the rotary element, in such a way as to not have to use a further rotary element for pushing the adhesive towards the sheet.

The movement of the adhesive towards the sheet may also occur by the effect of gravity.

When the adhesive is interposed between the bottom of the channel and the sheet, and therefore more or less in the ideal point of contact between the element and the sheet, the pressure of the element on the adhesive and against the sheet promotes the application of adhesive.

Preferably, the channel is defined by at least one groove made on the side surface of the rotary element.

Preferably, the channel is designed to convey the adhesive towards the sheet along an axis of extension of the channel, which lies at least partly in an ideal plane transversal to the axis of rotation.

Preferably, the nozzle is positioned above the element in such a way as to introduce the adhesive into the channel by gravity.

Therefore, the adhesive escapes from the nozzle and moves towards the channel preferably at least by the effect of gravity. The application of the adhesive on the sheet therefore occurs preferably also due to the effect of gravity, since the nozzle is in this position relative to the rotary element.

Preferably, the device comprises at least one tank for containing adhesive. The tank is in fluid-dynamic communication with the nozzle.

Preferably, one or more parameters for dispensing the adhesive by the nozzle can be programmed using, for example, a control unit.

The one or more parameters comprise for example one or more time intervals during which the adhesive is dispensed by the nozzle, and/or in general the trend of the flow of adhesive which is dispensed over time.

In this way the application of the adhesive on the sheet may be performed according to a predetermined pattern, on the basis of the programming of parameters for dispensing the adhesive by the nozzle and/or at least of the path of the rotary element on the sheet.

The pattern means the geometrical pattern according to which the adhesive is distributed on an application surface of the sheet, on which, for example, another sheet or the springs of the mattress are subsequently attached. The geometrical pattern is to be considered viewed in plan on the application surface of the sheet on which the adhesive is applied.

The geometrical pattern in relief varies on the basis of the type of mattress. In effect, if a sheet identical to the previous one and having the same shape in plan view is to be glued, such as, for example, in the case of a mattress without springs, is necessary to apply the adhesive on the entire application surface of the sheet.

However, in the case of a mattress with springs, strips of adhesive will be created on the side edges of the sheet, since the respective trips which will make the respective side panels of the container in which the springs will be positioned will be glued in these zones.

Moreover, in the case of a double mattress with springs, it would also be possible to apply a strip of adhesive parallel to the edges, but central, in such a way as to glue the springs on the central strip. Or, for example, the application of adhesive may be requested in particular positions of the central zone of the sheet where particular stresses during use of the mattress are expected (for example, in zones where there might be a greater weight).

Moreover, the precision in programming the dispensing of the adhesive, in order to obtain the predetermined pattern and eliminate waste, is correlated with the possibility of precisely knowing the time interval between the dispensing and the moment in which contact occurs between adhesive and application surface of the sheet, on the basis of the speed and/or angular acceleration of the rotary element and on the basis of the length of the channel, which is in turn correlated with the dimensions of the rotary element.

Preferably, the axis of extension of the channel comprises a curve lying on an ideal plane transversal to the axis of rotation of the element.

The curve, in a possible embodiment of the invention, could lie on an ideal plane at right angles to the axis of rotation.

In this possible embodiment, the axis of extension may advantageously comprise a circumference located around the axis of rotation.

The device may advantageously comprise a plurality of channels and a plurality of nozzles. Each of these nozzles is associated with a respective channel of the plurality of channels and is designed to dispense the adhesive towards the respective channel. Each of the channels is designed to receive the adhesive and transport the adhesive towards the sheet during the rotation of the element, in such a way as to cause the subsequent application of the adhesive on the sheet. Each of the channels is positioned on the side surface of the rotary element.

The presence of several nozzles and several channels which each receive a respective flow of adhesive from the respective nozzle is required to simultaneously create, also by a single rotary element, strips of adhesive spaced from each other on the sheet, in order to reduce the time necessary to create the predetermined pattern of adhesive.

For example, in order to apply two strips of adhesive to the edges and one at the centre, as in the case explained above, a rotary element may be used which has at least two side grooves at the edges of the application surface of the sheet, and a central groove parallel to the others.

The dispensing times may also vary between the various nozzles, by suitably programming a control unit to which the device may be connected.

Another aspect of this invention relates to a machine comprising at least one device having one or more of the above-mentioned features. The machine may also comprise a plurality of devices each having one or more of these features.

The machine comprises movement means capable of at least causing the movement on the sheet of each device of the machine. If the machine comprises a single device, the movement means are therefore able to at least cause the movement on the sheet of this single device. If there are several devices, the movement means are therefore able to at least cause the movement on the sheet of all the devices, even separately from one another.

This movement of each device is designed to determine the rolling of the respective rotary element on the sheet.

The machine may also advantageously comprise a control unit connected to each device of the machine.

If the machine comprises a single device, the control unit is therefore connected to this single device. If there are several devices, the control unit may be connected to all the devices, even separately from one another.

The control unit is able to control the dispensing of the adhesive by each nozzle of each device of the machine. If the respective device comprises a single nozzle, the control unit is therefore able to control the dispensing of the adhesive by the single nozzle of the device. If the respective device comprises several nozzles, the control unit is therefore able to control the dispensing of the adhesive by all the nozzles, even separately from one another.

The control unit is preferably able to also control the movement of each device of the machine.

If the machine comprises a single device, the control unit is therefore able to control the movement on the sheet of this single device. If there are several devices, the control unit is able to control the movement on the sheet of all the devices, even separately from one another.

In this way the adhesive may be applied on the sheet according to a predetermined pattern.

According to another aspect, this invention relates to a method for using the machine.

The method comprises a programming step.

The movement on the sheet of each device of the machine is set up in this programming step, using the control unit. If the machine comprises a single device, only its movement is set up. If there are several devices, the movement of each of them is set up, even separately from one another.

One or more parameters for dispensing the adhesive by each nozzle of each device of the machine is also set up in this programming step.

If the respective device comprises a single nozzle, one or more dispensing parameters for the single nozzle is set up. If the respective device has several nozzles, one or more dispensing parameters for all the nozzles is set up, even separately from one another.

In this way, a distribution of the adhesive may be created precisely on the sheet according to a predetermined pattern.

These one or more dispensing parameters may comprise the time intervals during which the adhesive is dispensed, the dispensing flow rate, and/or the trend of the flow rate over time. This flow rate may also be zero.

BRIEF DESCRIPTION OF THE DRAWINGS

The features of this invention are described in detail below by way of a non-limiting example of the more general technical concepts claimed.

The detailed description which follows relates to the accompanying drawings, in which.

DETAILED DESCRIPTION OF PREFERRED EMBODIMENTS OF THE INVENTION

Figures 1, 2:
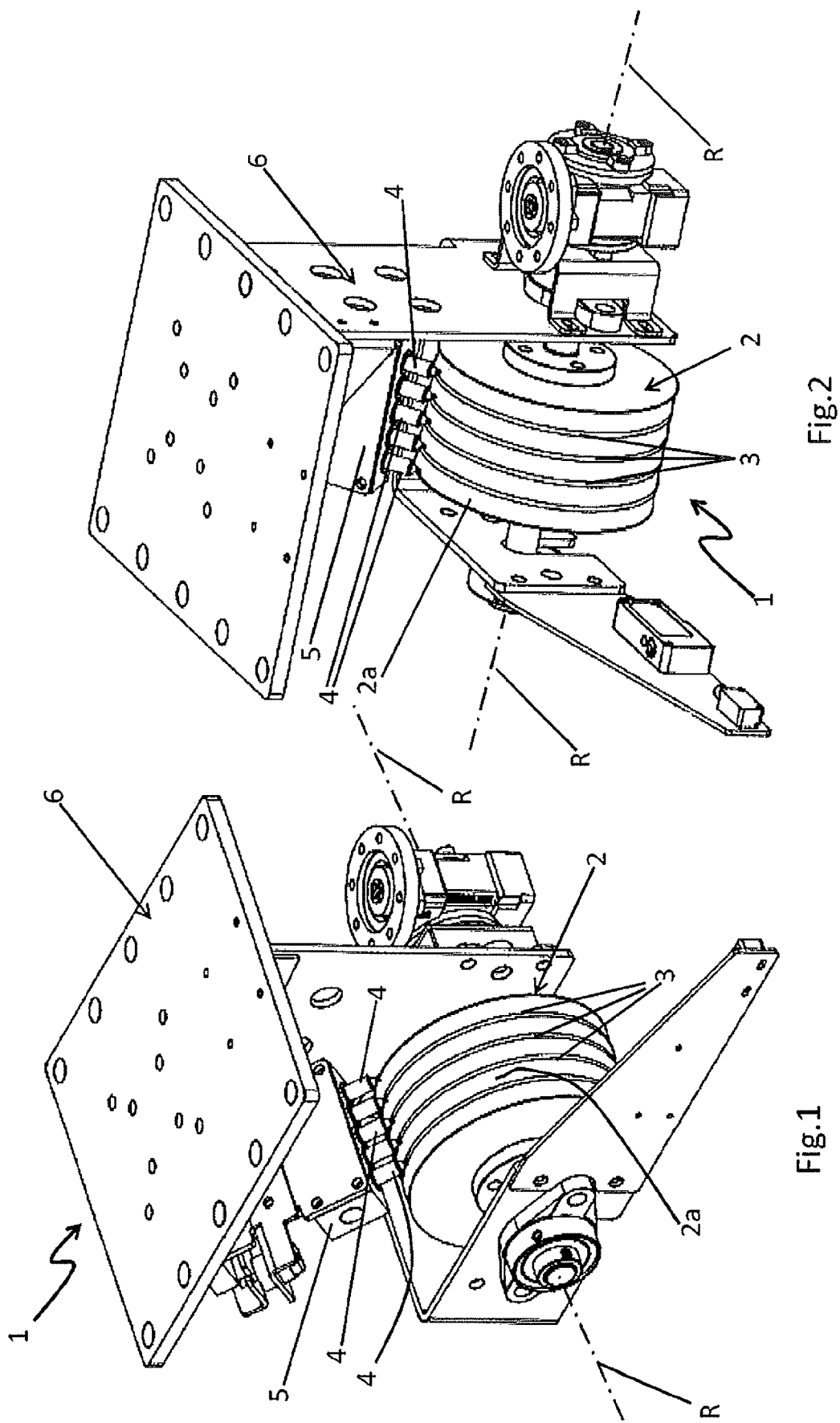
FIG. 1 shows a perspective view of a device according to a possible embodiment of this invention.
FIG. 2 shows the device from another perspective.

FIGS. 1 and 2 show two different perspective views of a device 1 for applying adhesive or adhesive material, on a sheet for mattresses, according to a possible embodiment of the invention.

The device 1 comprises a rotary element 2. The device 1 may rotate at least about the axis of rotation R.

The element 2 has at least one external side surface 2a. In the embodiment illustrated, the side surface 2a of the element 2 is at least partly coaxial with the axis of rotation R.

The side surface 2a, during the rotation of the element 2 on the sheet, is that which is at least partly in contact with and/or tangential to the application surface of the sheet on which the adhesive is applied.

In the embodiment illustrated, advantageously the element 2 is a roller, preferably cylindrical in shape. The side surface 2a, in the embodiment illustrated, is therefore the side surface of the cylinder defined by the element 2.

In the embodiment illustrated, the axis of rotation R coincides with the axis of the cylinder defined by the element 2.

The element 2 is designed to roll on the application surface of the sheet for mattresses, that is, translating on the same application surface and simultaneously rotating on itself about the axis of rotation R.

The axis of rotation R, considering the application surface of the sheet of the flat mattress, therefore remains parallel to the application surface, during a possible process for use of the device 1 of FIGS. 1 and 2.

The element 2 is designed to cause the application of the adhesive on the application surface of the sheet, due to at least the rotation of the element 2.

This application may also occur due to the effect of gravity, as will be described in more detail below. The pressure of the element 2 on the adhesive may also contribute to this application, when the adhesive is interposed and pressed between the element 2 and the application surface of the sheet.

This application occurs by rolling the element 1 on the surface of application.

The device 1 comprises at least one channel 3 and at least one nozzle 4 associated with the channel. The nozzle 4 is designed to dispense the adhesive towards the channel 3.

The channel 3 is situated advantageously on the side surface 2a of the element 2.

The device 1 advantageously comprises at least one tank 5 for containing the adhesive. The tank 5 is in fluid-dynamic communication with the nozzle 4, so that the adhesive reaches the nozzle 4.

The tank 5 may be connected to a system for feeding the adhesive, which may comprise a pump or a pressurised tank or a multiplicity of these.

One or more parameters for dispensing the adhesive from the nozzle 4 can be programmed using a control unit. The one or more parameters comprise for example one or more time intervals during which the adhesive is dispensed, and/or more generally the trend of the flow dispensed by the nozzle as a function of time.

This dispensing is programmable so preferably in terms of time and/or in terms of flow rate of adhesive, that is to say, quantity of adhesive delivered per unit time.

The channel 3 is designed to receive the adhesive and transport it towards the application surface of the sheet during rotation of the element 2 about the axis of rotation R. In this way the device 1 is designed to cause the subsequent application of the adhesive on the application surface of the sheet.

The channel 3 is advantageously formed on the side surface 2a of the element 2.

The channel 3 is defined by at least one groove made on the side surface.

The channel 3 extends at least partly in an ideal plane transversal to the axis of rotation R.

Preferably, the channel 3 is designed to convey the adhesive towards the application surface of the sheet, along an axis of extension of the channel which lies at least partly in an ideal plane transversal to the axis of rotation R.

That plane, in the embodiment illustrated, is orthogonal to the axis of rotation R.

The axis of extension of the channel 3 therefore comprises a curve lying on the ideal plane.

In the embodiment according to this invention illustrated in the accompanying drawings, the axis of extension advantageously comprises a circumference located around the axis of rotation R.

In the embodiment illustrated in the accompanying drawings, the nozzle 4 is positioned above the element 2 in such a way as to introduce the adhesive by gravity in the channel 3.

The nozzle 4 is designed to dispense the adhesive preferably at the centre of the generic transversal cross-section of the channel 3 which is designed to receive the adhesive from the nozzle 4. The side edges of the channel 3 are shaped advantageously to guarantee a good uniformity of application of the adhesive.

The embodiment of the device 1 according to FIGS. 1 and 2 advantageously comprises a plurality of channel 3, each of which may have one or more of the above-mentioned features. The embodiment of the device 1 according to the accompanying drawings advantageously comprises a plurality of nozzles 4, each of which may have one or more of the above-mentioned features. Each of these nozzles 4 is associated with one of the respective channels 3. Each nozzle 4 is designed to dispense the adhesive towards the respective channel 3.

Each of the channels 3 is designed to receive the adhesive dispensed by the respective nozzle 4 and transport it towards the application surface of the sheet during rotation of the element 2 about the axis of rotation R.

Each of the channels 3 is positioned on the side surface 2a of the element 2.

In FIGS. 1 and 2 only some of the nozzles 4 and some of the channels 3 are indicated, for reasons of clarity.

Regardless of the nozzles 4 and the channels 3 actually indicated in the drawings, it should be noted that, in the embodiment of FIGS. 1 and 2, there is a nozzle 4 for each respective channel 3. The nozzle 4 is positioned relative to the respective channel 3 for introducing the adhesive in the respective channel 3.

It should also be noted that for each nozzle 4 there may be at least one respective tank 5 of adhesive, even if FIGS. 1 and 2 only show a single tank 5.

Moreover, there may be a single system for feeding the adhesive for all the nozzles 4, or several feeding systems, for example each for a respective nozzle 4.

In any case, preferably each nozzle 4 can be fed independently from the others, in such a way that the flow rate of adhesive or adhesive material dispensed by each of the nozzles 4 of the device 1 is independent from that dispensed by the other nozzles 4 of the same device 1.

The embodiment of FIGS. 1 and 2 also advantageously comprises a supporting structure 6 of the element 2 and/or of the nozzles 4 and/or of the tanks 5.

Another aspect of this invention relates to a machine comprising at least one device having one or more of the above-mentioned features.

The machine may comprise a plurality of devices each having one or more of these features.

Figure 3:
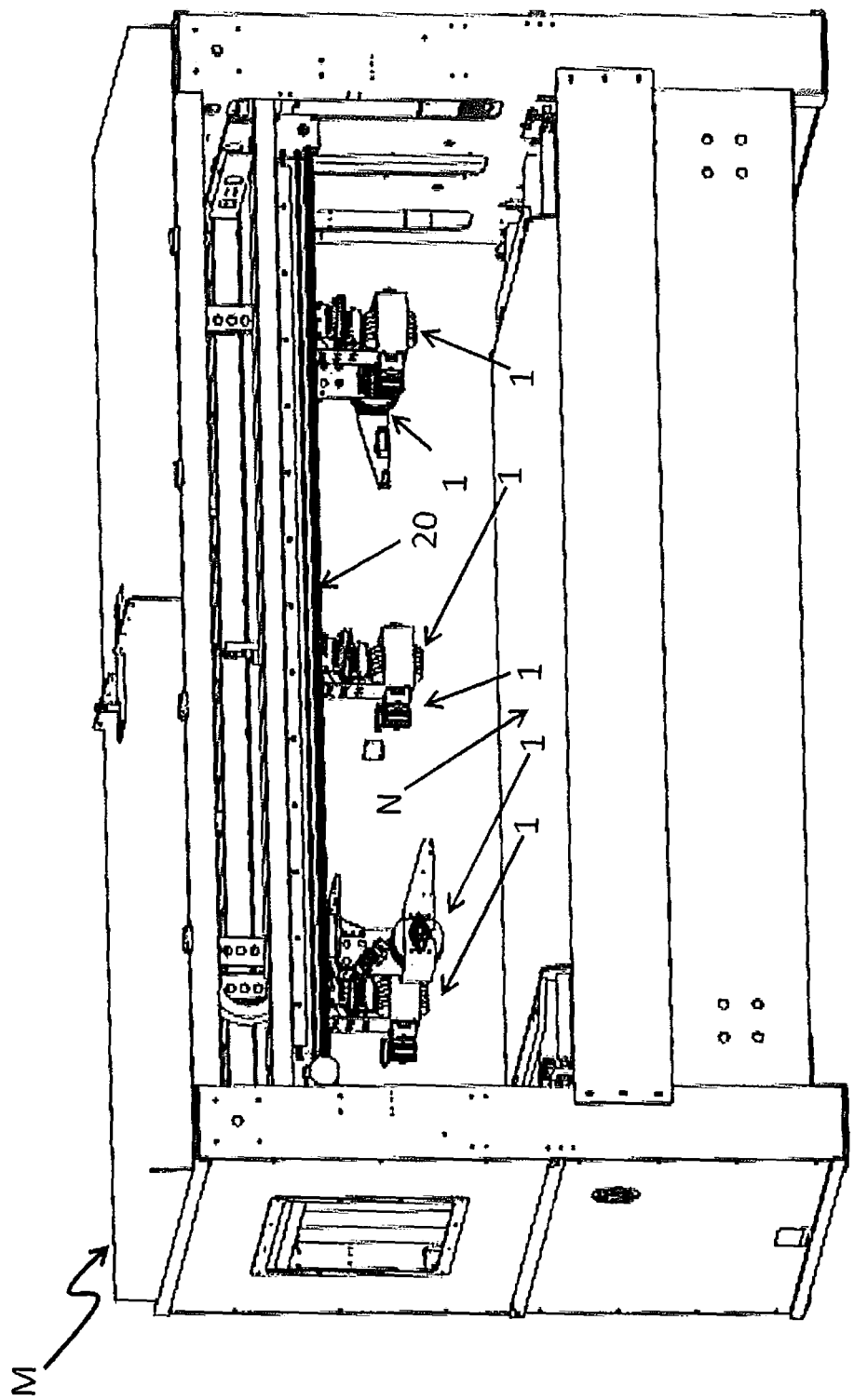
FIG. 3 shows a machine according to a possible embodiment of the invention.

The machine M of FIG. 3 comprises a number of devices 1 purely as an example.

The machine comprises movement means capable of at least causing the movement on the sheet of each device 1 of the machine. If the machine comprised a single device, the movement means would be able to at least cause the movement on the sheet of this single device.

If there are several devices, as in machine M of FIG. 3, the movement means are therefore able to at least cause the movement on the sheet of all the devices 1, even separately and/or independently from one another.

This movement of each device 1 is designed to determine in turn the rolling of the respective rotary element 2 on the sheet.

The machine may also advantageously comprise a control unit connected to each device 1 of the machine.

If the machine comprised a single device, the control unit would be connected to this single device. If there are several devices 1, as in the machine M of FIG. 3, the control unit may be connected to all these devices 1, also separately and/or independently of one another.

The control unit is able to control the dispensing of the adhesive by each nozzle of each device of the machine. If the respective device comprised a single nozzle, the control unit would be configured to control the dispensing of the adhesive by the single nozzle of the device. If the respective device 1 comprises several nozzles 4, as in the case of FIG. 3, in which each of the devices 1 of the machine M is of the type described in FIG. 1 or 2, the control unit is therefore configured to control the dispensing of the adhesive by all the nozzles 4, even separately and/or independently from one another.

The control unit is preferably configured to also control the movement of each device of the machine.

If the machine comprised a single device, the control unit would be configured to control the movement on the sheet of the single device. If there are several devices 1, as in machine M of FIG. 3, the control is therefore configured to control the movement on the sheet of all the devices 1, even separately and/or independently from one another.

In this way the adhesive may be applied on the sheet according to a predetermined pattern.

According to another aspect, this invention relates to a method for using the machine.

The method comprises a programming step.

The movement on the sheet of each device of the machine is set up in this programming step, using the control unit. If the machine comprised a single device, only its movement is set up. If there are several devices 1, as in the machine M of FIG. 3, the movement of each of them is set up, even separately from one another.

One or more parameters for dispensing the adhesive by each nozzle of each device of the machine is also set up in this programming step.

If the respective device comprised a single nozzle, one or more dispensing parameters for the single nozzle would be set up. If the device 1 comprises several nozzles, such as in the case of FIG. 3, in which each of the devices 1 is of the type described in FIG. 1 or 2, one or more dispensing parameters are set up by all the nozzles, even separately from one another.

In this way, a distribution of the adhesive may be created on the sheet according to a predetermined pattern.

These one or more dispensing parameters may comprise the time intervals during which the adhesive is dispensed, the dispensing flow rate, and/or the trend of the flow rate over time. This flow rate may also be zero, if necessary only for predetermined time intervals.

One or more of the devices 1 might also remain stationary and/or inactive.

It should also be noted that a machine according to this invention could comprise several devices which could also have, one relative to the other, one or more different features. The machine might also comprise a single device.

The machine might also allow the replacement of one or more devices.

These movement means, with reference for example to FIG. 3, may comprise, for example, movement systems 20 which act separately on each of the devices 1. These movement systems 20 may comprise transmission means and one or more motors.

The movement means may also comprise a conveyor belt N which is able to translate the sheet with the application surface facing towards the devices 1, in such a way that the devices 1 can be moved to cause the application of adhesive on the application surface of the sheet.

Figure 5:
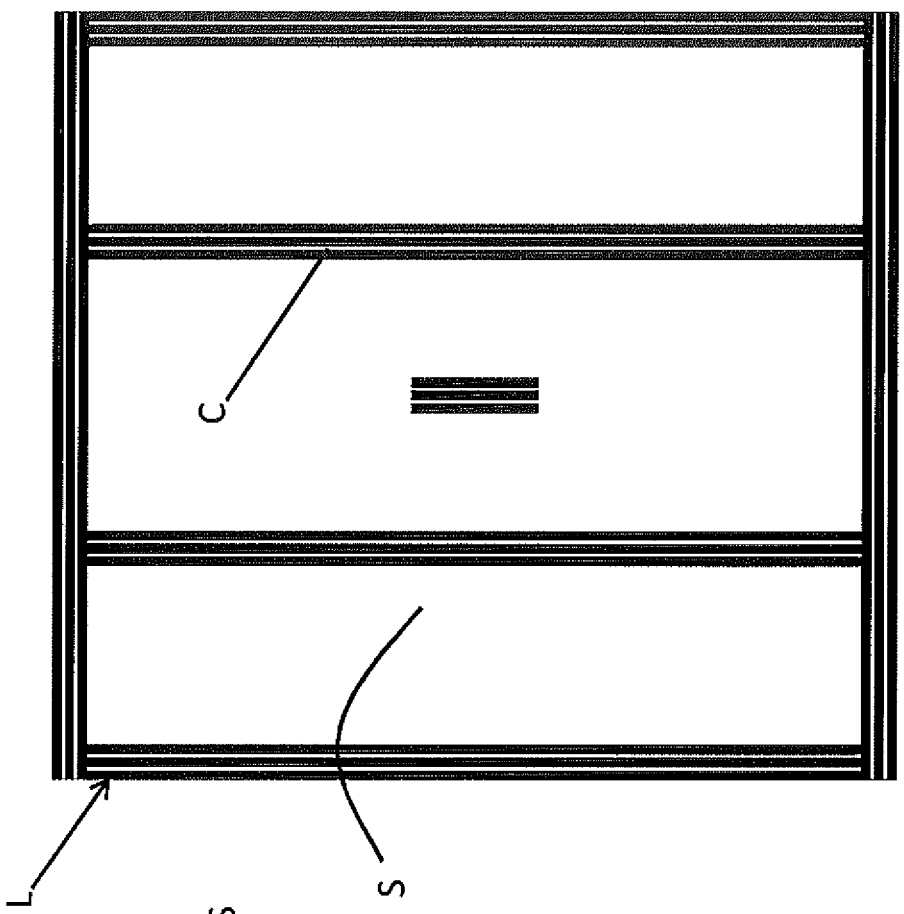
FIG. 5 is another geometrical pattern in relief according to which the adhesive may be applied on the sheet.
Figure 4:
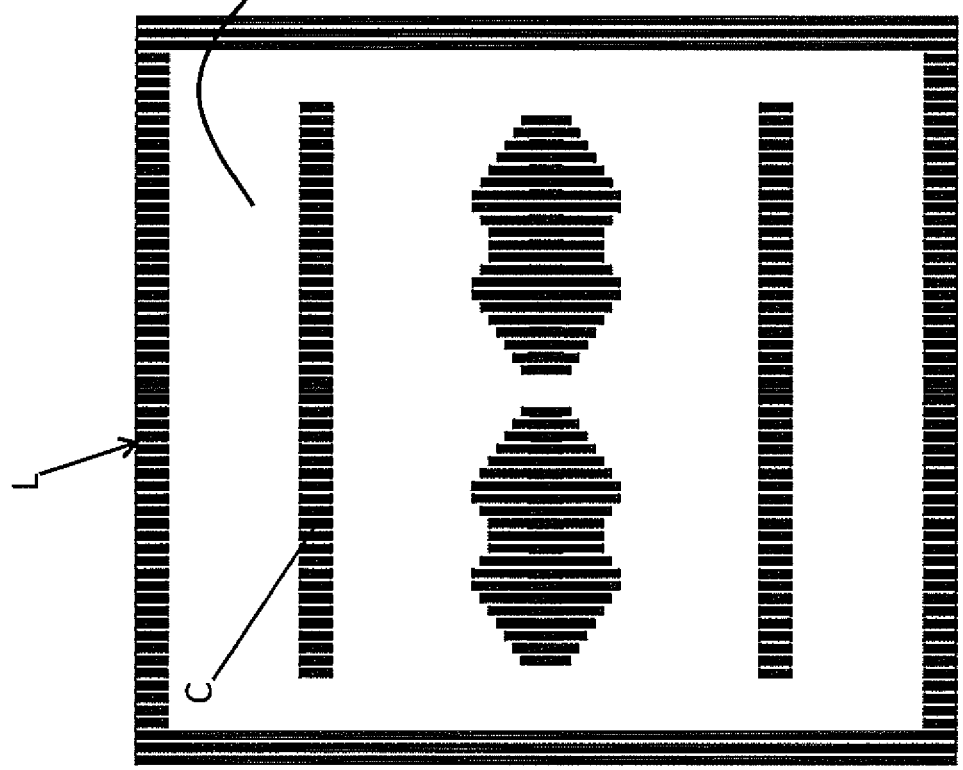
FIG. 4 shows the geometrical pattern in relief according to which adhesive may be applied on a sheet by a possible method of use of the machine of FIG. 3.

FIGS. 4 and 5 show C patterns of adhesive on the surface of application S of a sheet L for mattresses. The patterns can be obtained by means of a machine M in accordance with FIG. 3.

The pattern of FIG. 4 may also be obtained using a machine comprising a single roller which extends along the entire width of the sheet L, and which can translate in the direction of the black strips which indicate the adhesive C.

The invention achieves the preset aims, and provides a device for applying adhesive on a sheet for mattresses, which makes it possible to obtain an excellent precision in positioning of the adhesive on the sheet on the basis on the particular requirements, thanks to a very precise conveying of the adhesive towards the sheet. At the same time the device avoids the formation of coagulations, so as to eliminate the waste of adhesive and to further increase the precision in the production of the mattress.

This invention can also be used in the context of machines for applying adhesive designed to make more or less complex patterns on the sheet, also in a very short times.

This invention also makes it possible to programme in a very precise manner the parameters regarding the application of the adhesive on the basis of the pattern to be obtained, whether it comprises a single device or several devices.

The invention claimed is:

1. A device for applying adhesive to a sheet for mattresses, comprising:
    an adhesive application roller rotatable about at least one axis of rotation and having at least one outer side surface, the roller being configured, by rolling the roller on the sheet, to cause application of the adhesive on the sheet due to at least the rotation of the roller,
    a plurality of nozzles configured to dispense, by gravity, the adhesive towards the outer side surface, the outer side surface being configured to transport the adhesive towards the sheet during the rotation in such a way as to cause subsequent application of the adhesive on the sheet, wherein each of the nozzles is controllable independently from others of the nozzles such that a flow rate of adhesive dispensed by the each of the nozzles is independent from that dispensed by the others of the nozzles,
    a plurality of channels, the plurality of nozzles being aligned with respective ones of the plurality of channels and being configured to dispense the adhesive towards the respective ones of the plurality of channels, wherein each of the plurality of channels is configured to receive the adhesive and to transport the adhesive towards the sheet during the rotation in such a way as to cause the application of the adhesive on the sheet, each of the plurality of channels being positioned on the outer side surface and being defined by at least one groove made on the outer side surface.

2. The device according to claim 1, wherein each of the plurality of channels channel is configured to convey the adhesive towards the sheet along an axis of extension of the each of the plurality of channels, which lies at least partly in a plane transversal to the axis of rotation.

3. The device according to claim 1, wherein each of the plurality of nozzles is positioned above the roller in such a way as to introduce the adhesive into a respective one of the plurality of channels by gravity.

4. The device according to claim 1, comprising at least one tank for containing the adhesive, the tank being in fluid-dynamic communication with each of the plurality of nozzles.

5. The device according to claim 1, and further comprising a control unit configured for programming one or more parameters for dispensing the adhesive from each of the plurality of nozzles, the one or more parameters comprising one or more time intervals during which the adhesive is dispensed.

6. The device according to claim 1, wherein each of the plurality of nozzles is configured to dispense the adhesive at a center of a transversal cross-section of the respective one of the plurality of channels and wherein each of the plurality of channels includes side edges shaped for uniformity of application of the adhesive.

7. A machine for applying adhesive on a sheet for mattresses, comprising at least one of the device according to claim 1.

8. The machine according to claim 7, comprising a plurality of the devices according to claim 1.

9. The machine according to claim 8, comprising a movement device including a motor configured for causing movement of each of the plurality of devices of the machine.

10. The machine according to claim 9, comprising a control unit connected to each of the plurality of devices, the control unit configured to control dispensing the adhesive from each of the plurality of nozzles of each of the plurality of devices of the machine and/or to control the movement of each of the plurality of devices of the machine in such a way that the adhesive is applied on the sheet according to a predetermined pattern.

11. The machine according to claim 7, comprising a movement device including a conveyor configured for causing movement of the sheet.

12. A method of using a machine, comprising:
    providing a machine for applying adhesive on a sheet for mattresses, comprising:
        a plurality of devices for applying adhesive to a sheet for mattresses, each comprising:
            an adhesive application roller rotatable about at least one axis of rotation and having at least one outer side surface, the roller being configured, by rolling the roller on the sheet, to cause application of the adhesive on the sheet due to at least the rotation of the roller,
            a plurality of nozzles configured to dispense, by gravity, the adhesive towards the outer side surface, the outer side surface being configured to transport the adhesive towards the sheet during the rotation in such a way as to cause subsequent application of the adhesive on the sheet, wherein each of the nozzles is controllable independently from others of the nozzles such that a flow rate of adhesive dispensed by the each of the nozzles is independent from that dispensed by the others of the nozzles,
            a plurality of channels, the plurality of nozzles being aligned with respective ones of the plurality of channels and being configured to dispense the adhesive towards the respective ones of the plurality of channels, wherein each of the plurality of channels is configured to receive the adhesive and to transport the adhesive towards the sheet during the rotation in such a way as to cause the application of the adhesive on the sheet, each of the plurality of channels being positioned on the outer side surface and being defined by at least one groove made on the outer side surface, a movement device including a motor configured for causing movement of each of the plurality of devices of the machine, a control unit connected to each of the plurality of devices, the control unit configured to control dispensing the adhesive from each of the plurality of nozzles of each of the plurality of devices of the machine and/or to control movement of each of the plurality of devices of the machine in such a way that the adhesive is applied on the sheet according to a predetermined pattern, setting, using the control unit, the movement of each of the plurality of devicesdevice of the machine and one or more parameters for dispensing the adhesive from each of the plurality of nozzles of each of the plurality of devices in such a way as to create a distribution of the adhesive on the sheet according to a predetermined pattern.

* * * * *